United States Patent
Chendamarai Kannan et al.

(10) Patent No.: US 10,368,348 B2
(45) Date of Patent: Jul. 30, 2019

(54) PHYSICAL CONTROL CHANNEL SIGNALING ON A SHARED COMMUNICATION MEDIUM

(71) Applicant: QUALCOMM Incorporated, San Diego, CA (US)

(72) Inventors: Arumugam Chendamarai Kannan, San Diego, CA (US); Tao Luo, San Diego, CA (US); Chirag Sureshbhai Patel, San Diego, CA (US); Tamer Adel Kadous, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 15/353,876

(22) Filed: Nov. 17, 2016

(65) Prior Publication Data

US 2017/0142713 A1    May 18, 2017

Related U.S. Application Data

(60) Provisional application No. 62/257,169, filed on Nov. 18, 2015.

(51) Int. Cl.
*H04W 72/04* (2009.01)
*H04L 5/14* (2006.01)
*H04L 5/00* (2006.01)

(52) U.S. Cl.
CPC ....... *H04W 72/0446* (2013.01); *H04L 5/0048* (2013.01); *H04L 5/0053* (2013.01); *H04L 5/14* (2013.01); *H04W 72/0413* (2013.01)

(58) Field of Classification Search
CPC .. H04W 72/0446; H04W 72/0413; H04L 5/14
See application file for complete search history.

(56) References Cited

U.S. PATENT DOCUMENTS

| | | | |
|---|---|---|---|
| 2012/0014320 A1 | 1/2012 | Nam et al. | |
| 2013/0136028 A1* | 5/2013 | Gan | H04W 24/02 370/252 |

(Continued)

OTHER PUBLICATIONS

Ericsson: "Areas for latency reduction", 3GPP Draft; R2-153489, val. RAN WG2. No. Beijing. P.R. China; 20150824-20150828, Beijing, China, Aug. 23, 2015 (Aug. 23, 2015), XP051004201, 7 pages. Retrieved from the Internet: URL: http://www.3gpp.org/ftp/Meetings_3GPP_SYNC/RAN2/Docs/.

(Continued)

*Primary Examiner* — Yemane Mesfin
*Assistant Examiner* — Henry Baron
(74) *Attorney, Agent, or Firm* — MG-IP Law, P.C.

(57) ABSTRACT

Techniques for control channel signaling on a shared communication medium are disclosed. An access point or an access terminal may communicate over a communication medium in accordance with a Time Division Duplex (TDD) frame structure defining a set of subframes that each span a plurality of time-domain symbol periods. The access point may transmit and the access terminal may receive control information via a short Physical Uplink Control Channel (sPUCCH) on one or more of the subframes in a portion of the subframe configured for uplink signaling. The sPUCCH may comprise one or more pilot symbols and one or more payload symbols that collectively occupy a subset of less than all of the symbol periods in each of the one or more subframes.

20 Claims, 15 Drawing Sheets

(56) References Cited

U.S. PATENT DOCUMENTS

| | | | | |
|---|---|---|---|---|
| 2014/0269549 | A1* | 9/2014 | Stephens | H04W 74/0891 370/329 |
| 2016/0183293 | A1* | 6/2016 | Lei | H04W 72/14 370/329 |
| 2016/0219584 | A1* | 7/2016 | Bertrand | H04L 5/00 |
| 2016/0373325 | A1* | 12/2016 | Shanks | H04L 43/062 |
| 2017/0041103 | A1* | 2/2017 | Maattanen | H04L 1/1671 |
| 2018/0110052 | A1* | 4/2018 | Wei | H04W 72/0413 |

OTHER PUBLICATIONS

Ericsson: "Study of shorter TTI for Latency Reduction", 3GPP Draft; R2-154740, vol. RAN WG2, No. Malmo, Sweden; 20151005-20151009, Oct. 4, 2015 (Oct. 4, 2015), XP051005229, 8 pages. Retrieved from URL: http://www.3gpp.org/ftp/Meetinqs_3GPP_SYNC/RAN2/Docs/.

International Search Report and Written Opinion—PCT/US2016/062755—ISA/EPO—dated Feb. 13, 2017.

\* cited by examiner

PHYSICAL CONTROL CHANNEL SIGNALING ON A SHARED COMMUNICATION MEDIUM

CROSS-REFERENCE TO RELATED APPLICATION

The present application claims the benefit of U.S. Provisional Application No. 62/257,169, entitled "PHYSICAL CONTROL CHANNEL SIGNALING ON A SHARED COMMUNICATION MEDIUM," filed Nov. 18, 2015, assigned to the assignee hereof and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may need to coexist with the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof.

In one example, a communication method is disclosed. The method may include, for example, communicating over a communication medium in accordance with a Time Division Duplex (TDD) frame structure defining a set of subframes that each span a plurality of time-domain symbol periods; and transmitting or receiving control information via a short Physical Uplink Control Channel (sPUCCH) on one or more of the subframes in a portion of the subframe configured for uplink signaling, wherein the sPUCCH comprises one or more pilot symbols and one or more payload symbols that collectively occupy a subset of less than all of the symbol periods in each of the one or more subframes.

In another example, a communication apparatus is disclosed. The apparatus may include, for example, at least one processor, at least one memory coupled to the at least one processor, and at least one transceiver. The at least one processor and the at least one memory may be configured to control communication over a communication medium in accordance with a TDD frame structure defining a set of subframes that each span a plurality of time-domain symbol periods. The at least one transceiver may be configured to transmit or receive control information via an sPUCCH on one or more of the subframes in a portion of the subframe configured for uplink signaling, wherein the sPUCCH comprises one or more pilot symbols and one or more payload symbols that collectively occupy a subset of less than all of the symbol periods in each of the one or more subframes.

In another example, another communication apparatus is disclosed. The apparatus may include, for example, means for communicating over a communication medium in accordance with a TDD frame structure defining a set of subframes that each span a plurality of time-domain symbol periods; and means for transmitting or receiving control information via an sPUCCH on one or more of the subframes in a portion of the subframe configured for uplink signaling, wherein the sPUCCH comprises one or more pilot symbols and one or more payload symbols that collectively occupy a subset of less than all of the symbol periods in each of the one or more subframes.

In another example, a transitory or non-transitory computer-readable medium is disclosed, which, when executed by at least one processor, causes the at least one processor to perform operations for communication. The computer-readable medium may include, for example, code for communicating over a communication medium in accordance with a TDD frame structure defining a set of subframes that each span a plurality of time-domain symbol periods; and code for transmitting or receiving control information via an sPUCCH on one or more of the subframes in a portion of the subframe configured for uplink signaling, wherein the sPUCCH comprises one or more pilot symbols and one or more payload symbols that collectively occupy a subset of less than all of the symbol periods in each of the one or more subframes.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
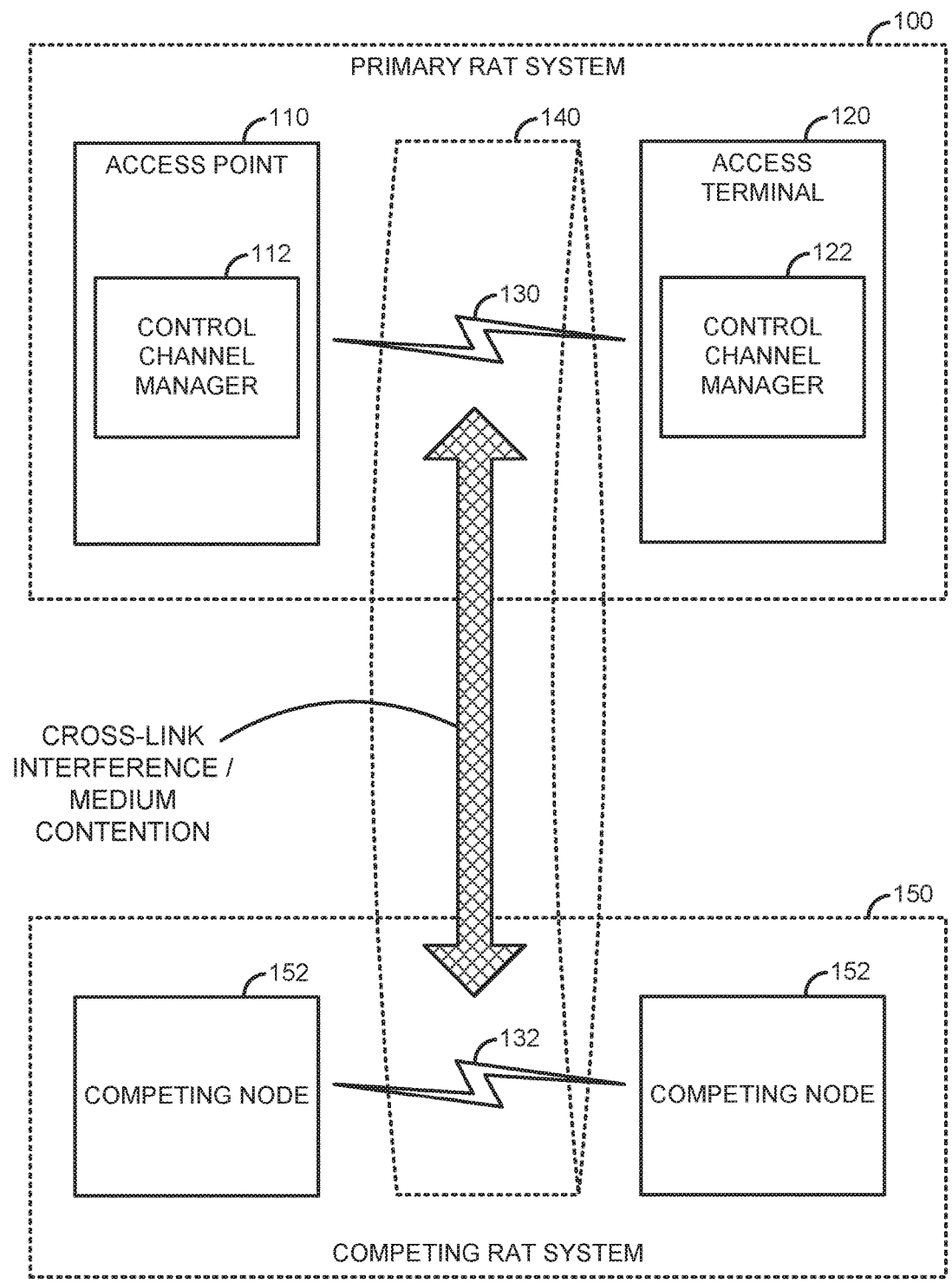
FIG. 1 is a system-level diagram illustrating an example wireless network environment.

The present disclosure relates generally to managing uplink control channel signaling on a shared communication medium. To better harmonize with various contention procedures that may be implemented on such a shared communication medium, a supplemental "short" uplink control channel described by way of example below as a short Physical Uplink Control Channel (sPUCCH) may be configured on one or more subframes designated to carry uplink information (e.g., uplink or special subframes). While a conventional PUCCH channel may occupy a transmission time interval (TTI) length of one subframe, or 1 ms (corresponding to 14 symbol periods under normal cyclic prefix (CP) operation), the sPUCCH may span only a subset of the symbol periods defined for the subframe in the time domain and may be interlaced across a set of subcarriers, in particular, resource blocks in the frequency domain. The duration of the sPUCCH may be (e.g., semi-statically) adapted and its payload may be variously configured as well as situated (e.g., within different configurations of a special subframe). The sPUCCH payload may also be variously proportioned across acknowledgement indicators for both current and prior transmission opportunities (TXOPs).

The shorter length of the sPUCCH relative to a conventional PUCCH may allow for more opportunistic transmission, such as transmission of PUCCH during truncated subframes, such as special subframes where only some of the symbols of the special subframe are allocated for uplink transmissions (while other symbols of the special subframe are allocated for downlink transmissions or transmission gaps allowing for propagation delays). The shorter length of the sPUCCH may also allow for more efficient usage of uplink resources, especially when the payload is small. Further, the shorter control signaling transmissions associated with the sPUCCH may be subject to less stringent Listen-Before-Talk requirements, such as clear channel assessment (CCA) requirements.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the dynamic control channel signaling techniques discussed briefly above. For example, the access point 110 may include a control channel manager 112 and the access terminal 120 may include a control channel manager 122. The control channel manager 112 and/or the control channel manager 122 may be configured in different ways to manage the configuration of control channels on the communication medium 140, such as a short Physical Uplink Control CHannel (sPUCCH) as will be described in further detail below.

Figure 2:
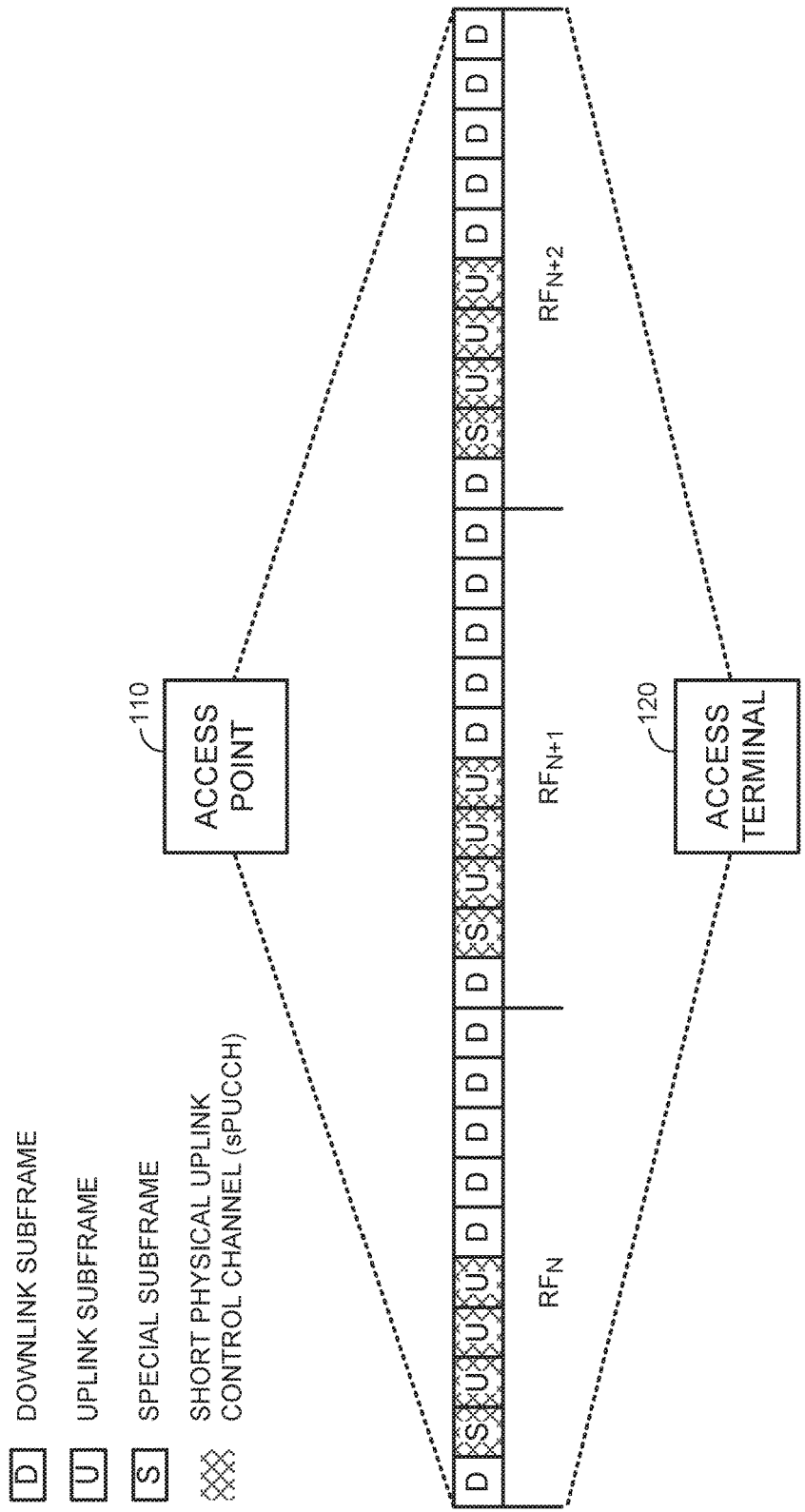
FIG. 2 illustrates an example Time Division Duplex (TDD) frame structure.

FIG. 2 illustrates an example Time Division Duplex (TDD) frame structure that may be implemented for the primary RAT system 100 on the communication medium 140 to facilitate contention-based access to the communication medium 140.

The illustrated frame structure includes a series of radio frames (RFs) that are numbered in accordance with a system frame number numerology ($RF_N$, $RF_{N+1}$, $RF_{N+2}$, etc.) and divided into respective subframes (SFs), which may also be numbered for reference (e.g., SF0, SF1, etc.). Each respective subframe may be further divided into slots (not shown in FIG. 2), and the slots may be further divided into symbol periods. As an example, the LTE frame structure includes system frames that are divided into 1024 numbered radio frames composed of 10 subframes each, which together constitute a system frame cycle (e.g., lasting 10.24 s for 10 ms radio frames having 1ms subframes). Moreover, each subframe may comprise two slots, and each slot may comprise six or seven symbol periods. The use of a frame structure may provide more natural and efficient coordination among devices than more ad hoc signaling techniques.

The example frame structure of FIG. 2 is TDD in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes may be referred to as different TDD configurations. Returning to the LTE example above, the TDD variant of the LTE frame structure includes 7 TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios. In the illustrated example of FIG. 2, a TDD configuration is employed that is similar to TDD Config 3 in LTE.

In some designs, the frame structure of FIG. 2 may be "fixed" in that the location of each subframe may be predetermined in relation to an absolute time, but may or may not be occupied by primary RAT signaling in any given instance due to the contention procedure for accessing the communication medium 140. For example, if the access point 110 or the access terminal 120 fails to win contention for a given subframe, that subframe may be silenced. In other designs, however, the frame structure of FIG. 2 may be "floating" in that the location of each subframe may be dynamically determined in relation to the point at which access to the communication medium 140 is secured. For example, the start of a given frame (e.g., $RF_{N+1}$) may be delayed in relation to an absolute time until the access point 110 or the access terminal 120 is able to win contention.

As will be described in more detail below, one or more subframes designated to carry uplink information (e.g., any or all of the uplink or special subframes in the example of FIG. 2) may be configured to provide a supplemental "short" uplink control channel described by way of example below as a short Physical Uplink Control Channel (sPUCCH). The sPUCCH may be used to complement other uplink control channels of the primary RAT system 100 by carrying short-duration control information such as acknowledgment messages, channel quality indicators, and so on. In general, the sPUCCH may be transmitted on a subset of the total number of symbol periods allocated to a subframe, such as on the uplink symbols of a special subframe. In this way, the sPUCCH may provide for a more efficient use of resources for small-payload signaling, more opportunistic access to the communication medium 140 (e.g., via truncated subframes such as special subframes), and, in some cases, contention-exempt access to the communication medium 140—due, for example, to special exemptions for short transmission durations. Various aspects of the sPUCCH are described below to facilitate efficient operation over the communication medium 140.

Figure 3:
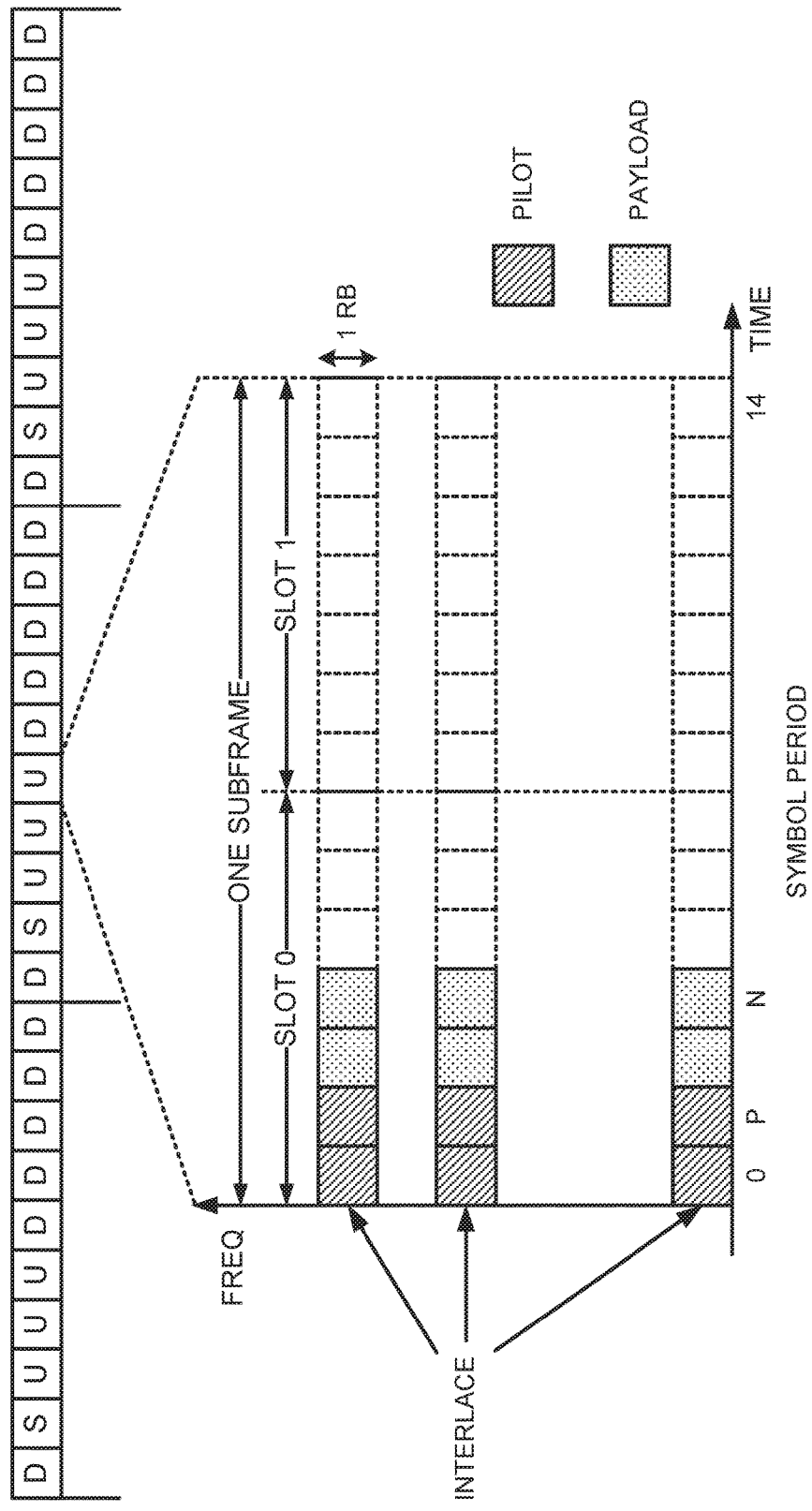
FIG. 3 is a resource map illustrating an example physical layer structure for a short Physical Uplink Control Channel (sPUCCH).

FIG. 3 is a resource map illustrating an example physical layer structure for the sPUCCH. In this example, the sPUCCH is configured on a first portion of an uplink subframe having a series of symbol periods spanning two slots (e.g., 14 symbol periods for a normal Cyclic Prefix (CP)). It will be appreciated that the configuration of a first portion of one uplink subframe is shown for illustration purposes only, and that a similar configuration may be applied to other portions of the uplink subframe, to multiple uplink subframes, to other subframes having a segment dedicated to uplink signaling (e.g., a special subframe), and so on.

In general, the sPUCCH may occupy a subset N of less than all of the symbol periods making up the subframe. In the illustrated example, the first P symbol periods are designated for pilot symbol signaling (e.g., Demodulation Reference Signaling (DMRS)) and the remaining N-P symbol periods carry the sPUCCH payload symbols. As an example, the sPUCCH may occupy up to one slot (e.g., N={2, 3, 4, ..., 7}) with the pilot signaling occupying a few of the leading symbol periods (e.g., P={1, 2}) in a Time Division Multiplexed (TDM) fashion.

As shown, each sPUCCH symbol period may span one or more Resource Blocks (RBs) formed from a set of subcarriers in the frequency domain. For frequency diversity, power usage efficiency, and to meet various channel occupancy requirements, the RBs dedicated to sPUCCH may be interlaced across the channel bandwidth. As an example, for a 20 MHz bandwidth with 100 RBs, a set of 10 RBs consisting of every 10th RB may be dedicated to sPUCCH for the access terminal 120.

For each sPUCCH symbol period, a Zadoff-Chu sequence or the like may be generated with a length equal to 12 times the number of RBs, with the additional qualification that the number of RBs is incremented in blocks of interlaces. Returning to the example above, for a 20 MHz bandwidth in which each interlace consists of a set of 10 RBs, the number of RBs=10×N inter, where N inter is the number of interlaces allocated to the access terminal 120.

Figure 4:
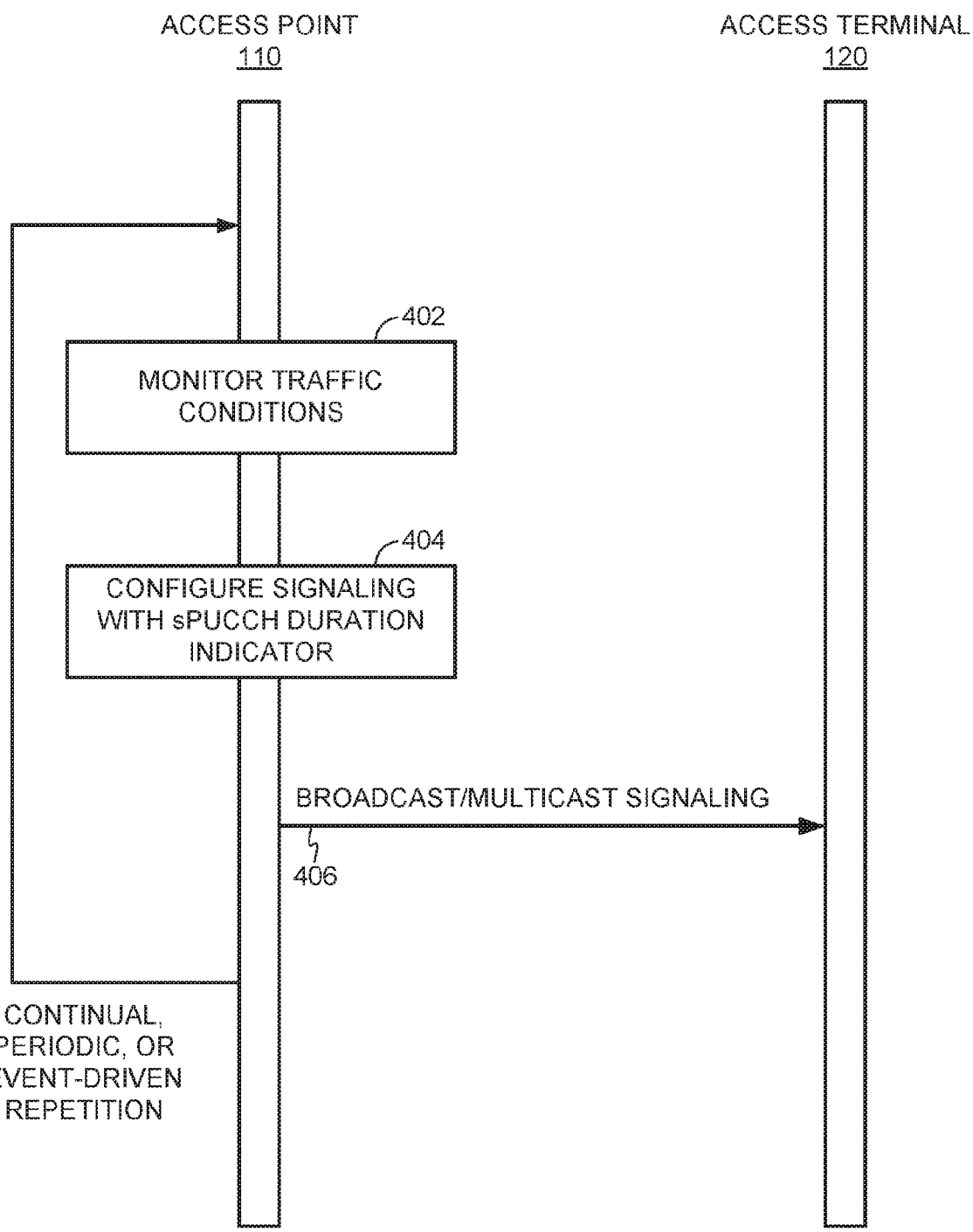
FIG. 4 is a signaling flow diagram illustrating an example adjustment procedure to adapt the sPUCCH duration.

FIG. 4 is a signaling flow diagram illustrating an example adjustment procedure to adapt the sPUCCH duration to traffic conditions within the primary RAT system 100. In some designs, the duration of the sPUCCH may be static and pre-provisioned at the access terminal 120. In other designs, however, the duration of the sPUCCH may be variable and signaled (e.g., semi-statically) to the access terminal 120.

In the illustrated example, the access point 110 may monitor traffic conditions for various factors affecting the payload length of the sPUCCH, such as the number of Multiple Input Multiple Output (MIMO) layers being acknowledged, the number of downlink subframes being acknowledged (e.g., by way of the TDD configuration and the user scheduling therein), the number of component carriers being acknowledged (e.g., one or more Secondary Cell (SCell) component carriers being acknowledged on the sPUCCH over a Primary Cell (PCell)), and so on (block 402).

Based on the various factors, the access point 110 may configure semi-static signaling (e.g., a system information block or the like) with an sPUCCH duration indicator (e.g., the number of symbol periods) (block 404), at least for designs in which the sPUCCH is not grant-based. At some time later, the access point 110 may send (e.g., broadcast or multicast) the signaling configured to convey the sPUCCH duration to the access terminal 120 along with any other access terminals being served (signaling 406).

The adjustment procedure may be repeated as desired, on a continual, periodic, or event-driven basis.

Figure 5:
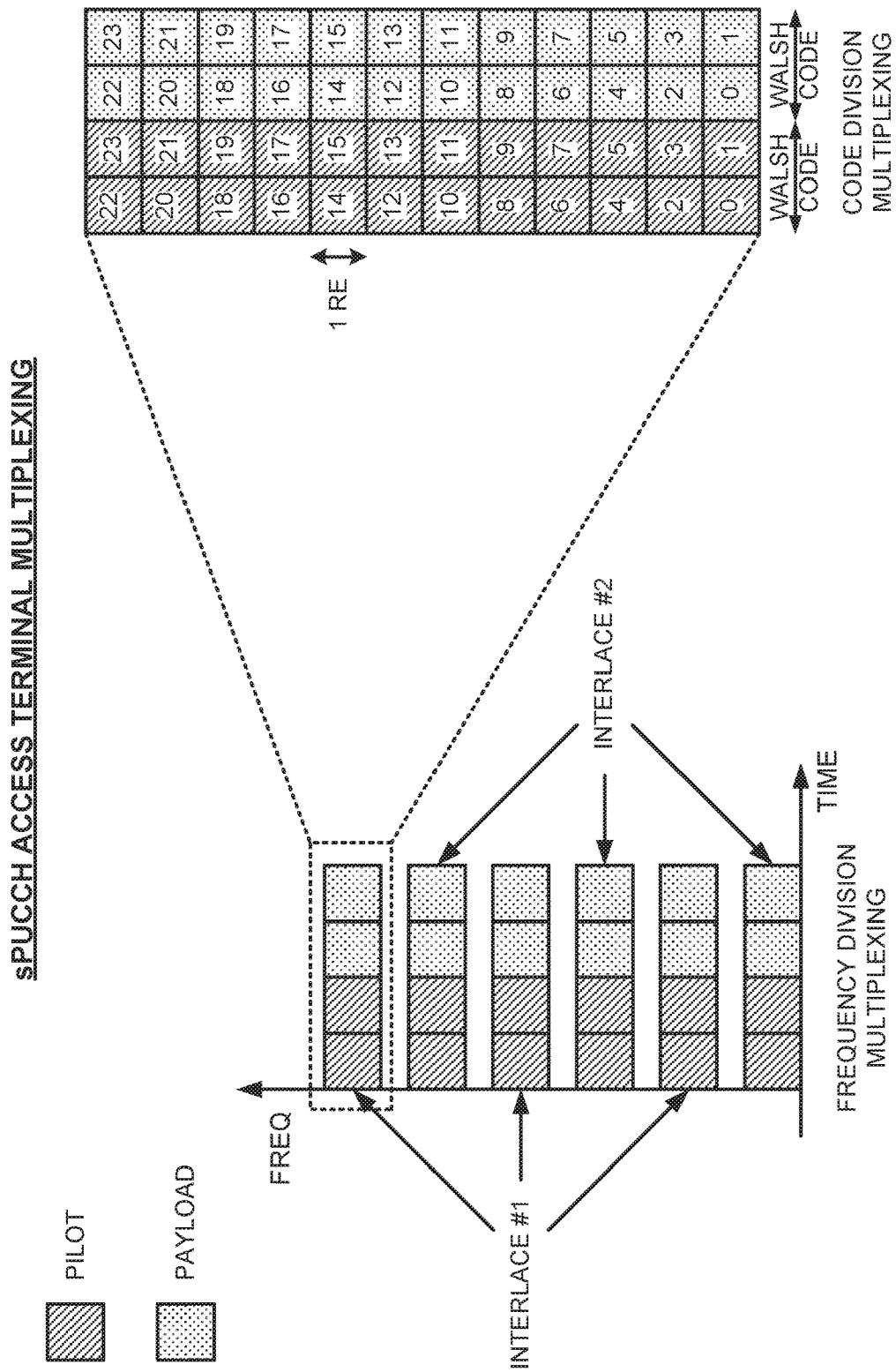
FIG. 5 is a resource map illustrating an example sPUCCH multiplexing scheme across access terminals.

FIG. 5 is a resource map illustrating an example sPUCCH multiplexing scheme across access terminals. In general, the sPUCCH may be frequency division multiplexed by allocating different interlaces to different access terminals. In the illustrated example, a first interlace (interlace #1) may be allocated to a first access terminal (e.g., the access terminal 120) and a second interlace (interlace #2) may be allocated to a second access terminal. Further, within a given interlace, multiple access terminals may be accommodated via code division multiplexing. The code division multiplexing may be achieved in the time domain, in the frequency domain, or both (as shown). In the time domain, Walsh codes may be used across symbol periods. The length of the Walsh codes employed may depend on the length of the sPUCCH (e.g., a length of 2 in the illustrated example where N=4 and P=2). In the frequency domain, Walsh codes may be used across Resource Elements (REs) within a given RB.

Figure 6A:
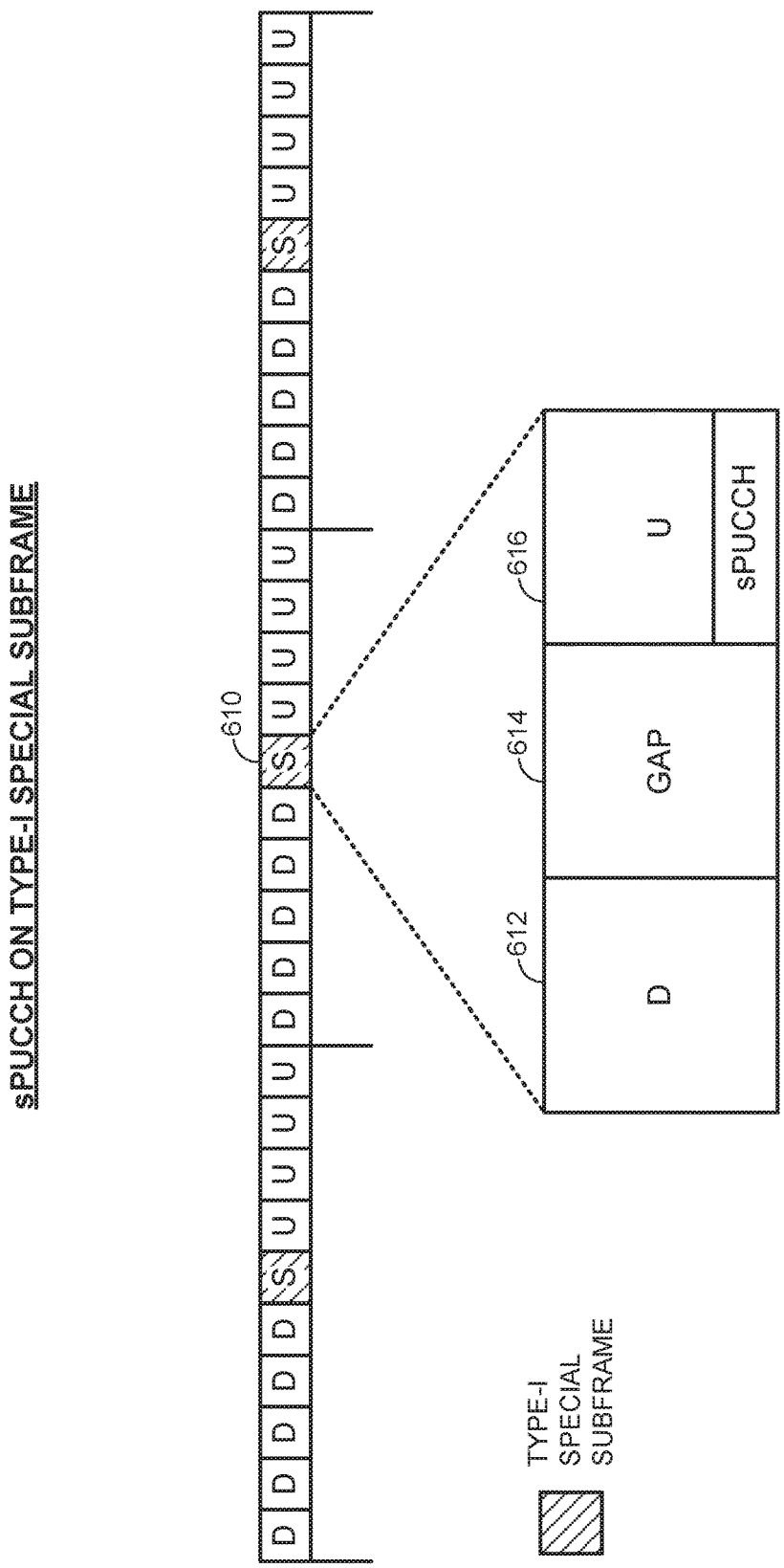
FIGS. 6A-6B illustrate example special subframe structures that may be utilized for the sPUCCH.
Figure 6B:
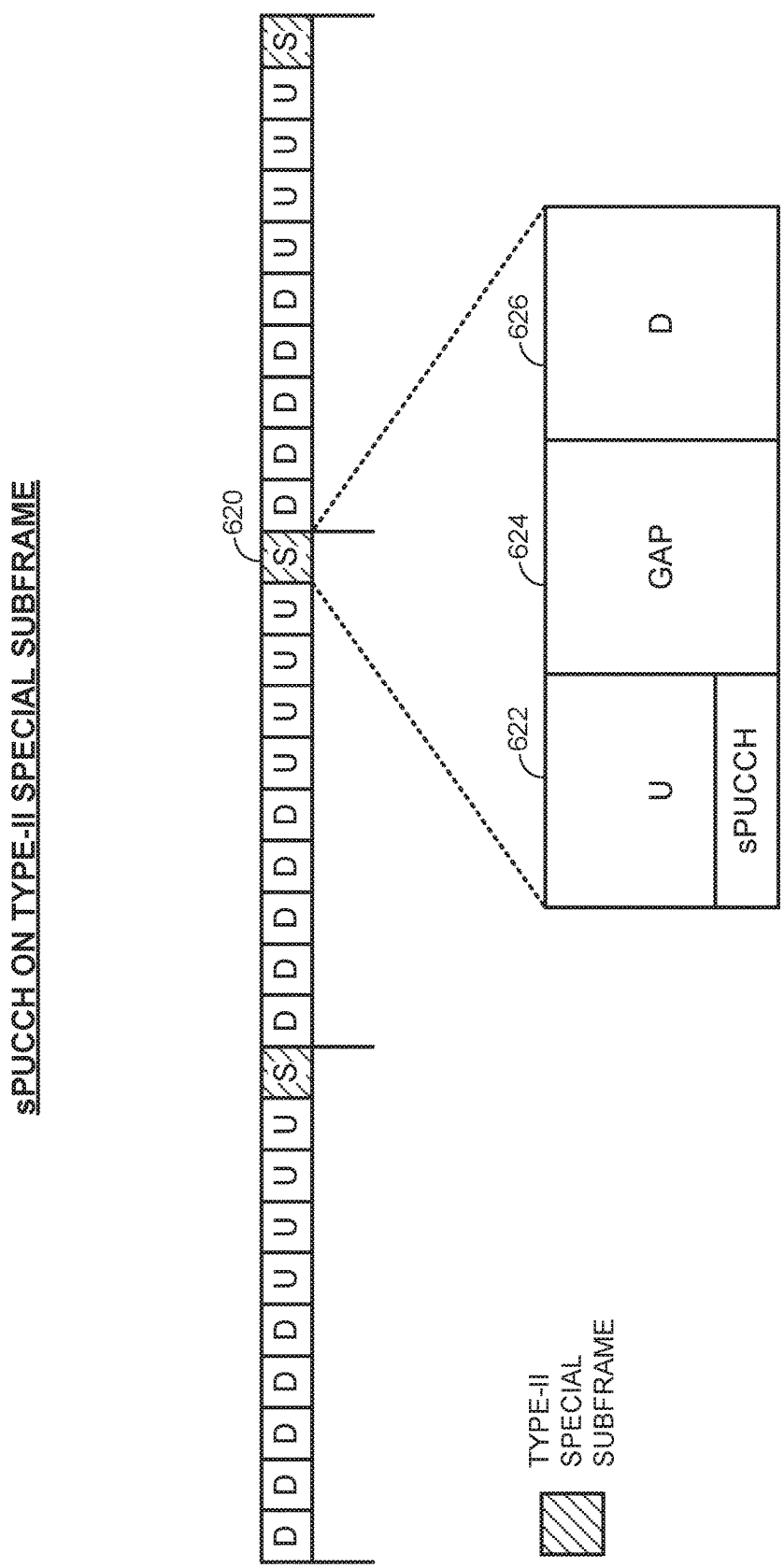

FIGS. 6A-6B illustrate example special subframe structures that may be utilized for the sPUCCH. As discussed above, the short duration of the sPUCCH being less than a full subframe may provide for more opportunistic access to the communication medium 140 via truncated subframes such as special subframes.

In the design of FIG. 6A, the special subframe 610 is referred to as a "type-I" special subframe and divided into three portions, including a downlink portion 612, followed by a gap portion 614, followed by an uplink portion 616. As shown, in this design, the sPUCCH may be situated in the uplink portion 616 at the end of the type-I special subframe 610. In the design of FIG. 6B, the special subframe 620 is referred to as a "type-II" special subframe and again divided into three portions but with a different temporal arrangement, including an uplink portion 622, followed by a gap portion 624, followed by a downlink portion 626. As shown, in this design, the sPUCCH may be situated in the uplink portion 622 at the beginning of the type-II special subframe 620. The length of each portion may be variable, including of zero length, in different scenarios. Different lengths of each portion may each constitute a different special subframe configuration for type-I as well as type-II special subframes.

As is further illustrated in FIGS. 6A-6B, the location of the type-I special subframe 610 and the type-II special subframe 620 may be offset from one another within the frame structure to accommodate the different temporal arrangements of the uplink/downlink portions. In particular, the type-I special subframe 610 may be deployed at the downlink-to-uplink transition boundary (e.g., between a burst of downlink subframes followed by a burst of uplink subframes) to align the downlink portion 612 with a preceding downlink subframe and the uplink portion 616 with a succeeding uplink subframe (e.g., to minimize the overhead associated with transition). In contrast, the type-II special subframe 620 may be deployed at the uplink-to-downlink transition boundary (e.g., between a burst of uplink subframes followed by a burst of downlink subframes) to align the uplink portion 622 with a preceding uplink subframe and the downlink portion 626 with a succeeding downlink subframe (e.g., again, to minimize the overhead associated with transition).

In either case, the gap portion 614 of the type-I special subframe 610 or the gap portion 624 of the type-II special subframe 620 may be used for contention (e.g., CCA) for gaining access to the communication medium 140, or, in some deployments, may be skipped such as when the sPUCCH carries contention-exempt signaling. As in licensed LTE, for example, a part of the gap portion 614 may also be used to account for timing advance to handle propagation delays in TDD systems. The type-II special subframe 620 may be advantageous in such deployments because the gap portion 624 may instead be used for contention for the upcoming downlink subframes.

Figure 7:
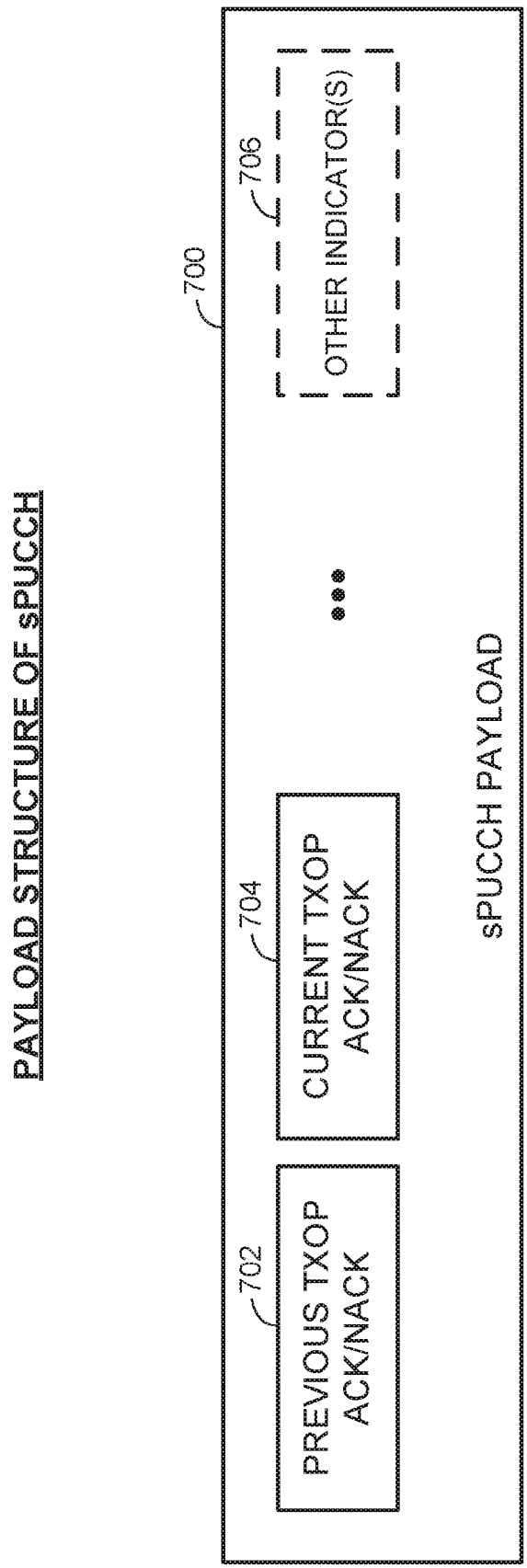
FIG. 7 illustrates an example sPUCCH payload structure.

FIG. 7 illustrates an example sPUCCH payload structure. In this example, the sPUCCH payload 700 includes, in relevant part, acknowledgment/negative acknowledgment (ACK/NACK) indicators that are separated into a previous transmission opportunity (TXOP) ACK/NACK field 702 and a current TXOP ACK/NACK field 704. The sPUCCH payload 700 may also (optionally) include one or more other indicators 706 as required for any given implementation (e.g., to convey channel quality information and so on).

In general, the previous TXOP ACK/NACK field 702 may be used to carry ACK/NACK indicators for one or more downlink subframes in a TXOP occurring prior to the current TXOP (e.g., a previous radio frame $RF_{N-1}$ occurring prior to the current radio frame $RF_N$) and the current TXOP ACK/NACK field 704 may be used to carry ACK/NACK indicators for one or more downlink subframes in the current TXOP (e.g., the current radio frame $RF_N$). Because of the delays associated with processing each downlink subframe and generating the appropriate ACK/NACK indicator, it may not be feasible to acknowledge each downlink subframe within the sPUCCH of its own TXOP. By providing and designating the previous TXOP ACK/NACK field 702 as such, these older ACK/NACK indicators may be properly identified and handled by the access point 110 even when contention may temporarily block access to the communication medium 140.

FIGS. 8A-8D illustrate the example sPUCCH payload structure of FIG. 7 deployed across different types of special subframes and different TDD configurations. In general, the relative length between the previous TXOP ACK/NACK field 702 and the current TXOP ACK/NACK field 704 within the sPUCCH payload may be adapted or otherwise set to fit the location of the sPUCCH in the frame structure as well as the TDD configuration employed. A larger previous TXOP ACK/NACK field 702 relative to the current TXOP ACK/NACK field 704 may be utilized in conjunction with the type-I special subframe as compared to the type-II special subframe, for example, to accommodate the additional downlink subframes that will be located within a processing delay threshold of the previous special subframe associated with the previous TXOP. Meanwhile, a smaller previous TXOP ACK/NACK field 702 relative to the current TXOP ACK/NACK field 704 may be utilized in conjunction with a downlink-heavy TDD configuration as compared to an uplink-heavy TDD configuration, for example, to accommodate the additional downlink subframes that will be located within a given TXOP ahead of the transition boundary where the special subframe is located.

Figure 8A:
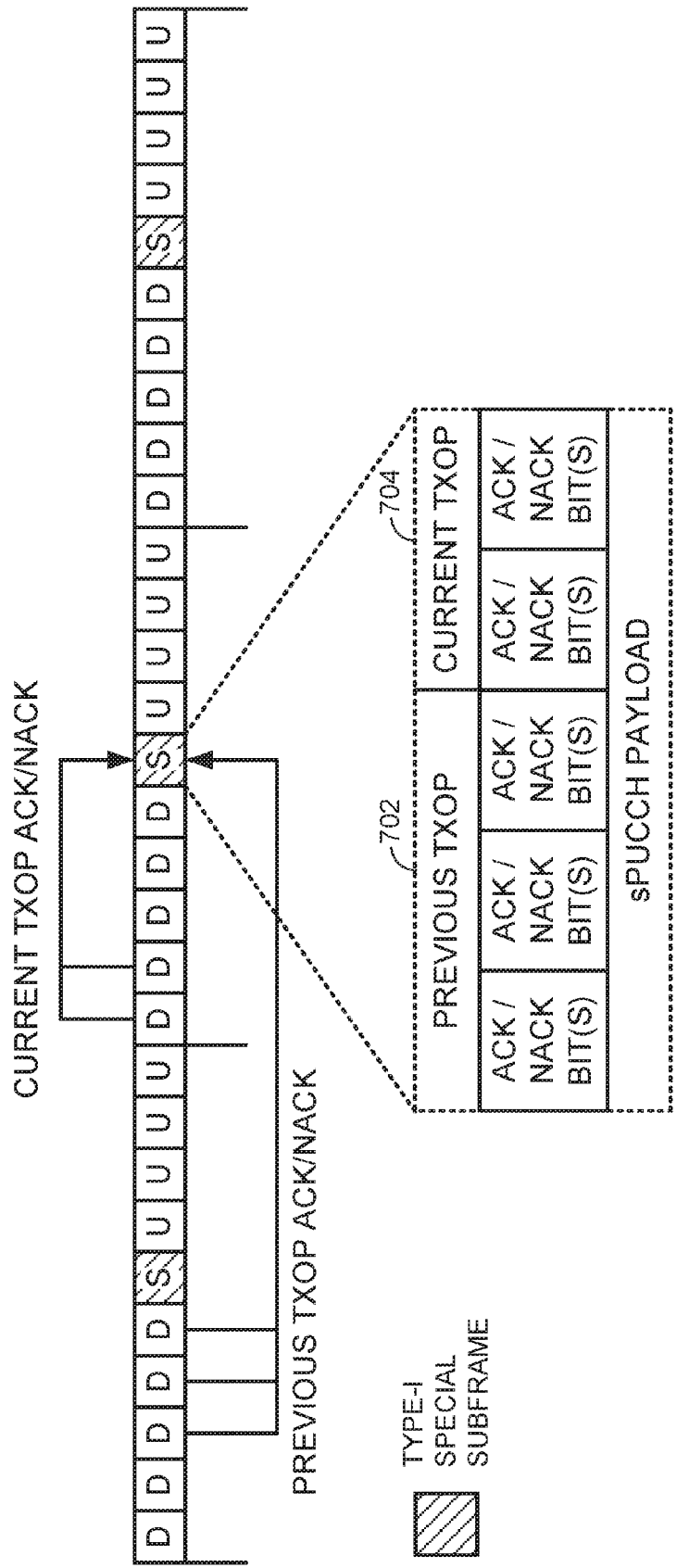
FIGS. 8A-8D illustrate the example sPUCCH payload structure of FIG. 7 deployed across different types of special subframes and different TDD configurations.

In the example of FIG. 8A, the type-I special subframe and the balanced TDD configuration (5 downlink subframes/4 uplink subframes) described in detail above with reference to FIG. 6A are shown along with an example minimum acknowledgment processing delay of 4 subframes for illustration purposes. Here, the sPUCCH payload may need to accommodate ACK/NACK for 3 downlink subframes from the previous TXOP (including those downlink subframes that are less than 4 subframes from the special subframe carrying the sPUCCH) and 2 downlink subframes from the current TXOP (including those downlink subframes that are at least 4 subframes from the special subframe carrying the sPUCCH).

Accordingly, in this example, more ACK/NACK bits may be allocated to the previous TXOP ACK/NACK field 702 as compared to the current TXOP ACK/NACK field 704. It will be appreciated that the specific number and proportion of the ACK/NACK bit allocation may vary from application to application based on implementation details such as Hybrid Automatic Repeat Request (HARQ) multiplexing, HARQ bundling, and so on. The illustrated allocation of 5 sets of one or more ACK/NACK bits across the previous TXOP ACK/NACK field 702 and the current TXOP ACK/NACK field 704 is provided for illustration purposes only and intended simply to show the relative differences between the length of the previous TXOP ACK/NACK field 702 and the length of the current TXOP ACK/NACK field 704 in this example.

Alternatively, the length of the sPUCCH payload may be a function of either the maximum number of HARQ processes or the number of currently active HARQ processes. In the former, the maximum number of HARQ processes may be semi-statically configured by the access point 110, and in the latter, the access terminal 120 may transmit ACK/NACK information only for the scheduled HARQ processes.

Figure 8B:
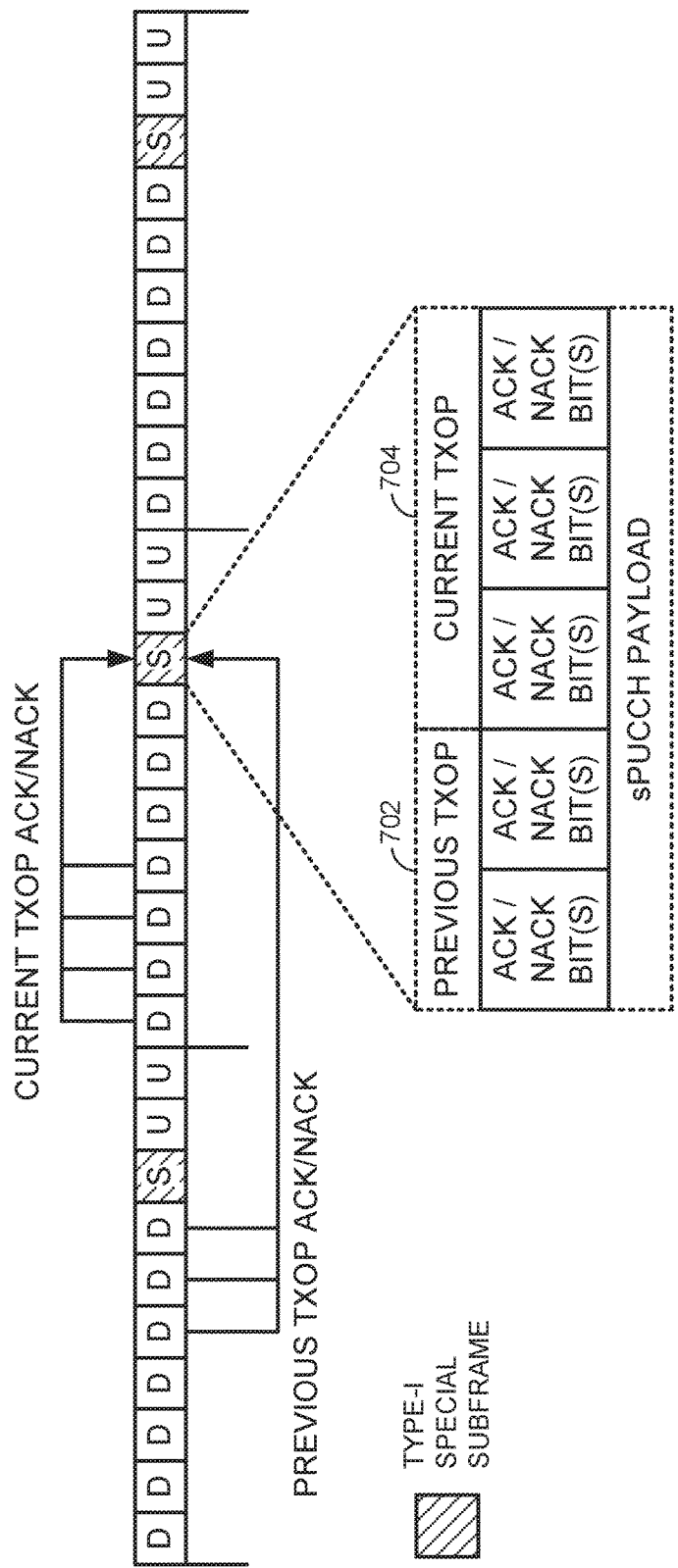

In the example of FIG. 8B, the type-I special subframe and a more downlink-heavy TDD configuration (7 downlink subframes/2 uplink subframes) are shown along with an example minimum acknowledgment processing delay of 4 subframes for illustration purposes. Here, the sPUCCH payload may need to accommodate ACK/NACK for 3 downlink subframes from the previous TXOP (including those downlink subframes that are less than 4 subframes from the special subframe carrying the sPUCCH) and 4 downlink subframes from the current TXOP (including those downlink subframes that are at least 4 subframes from the special subframe carrying the sPUCCH).

Accordingly, in this example, more ACK/NACK bits may be allocated to the current TXOP ACK/NACK field 704 as compared to the previous TXOP ACK/NACK field 702. It will again be appreciated that the specific number and proportion of the ACK/NACK bit allocation may vary from application to application, and that the illustrated allocation of 5 sets of one or more ACK/NACK bits across the previous TXOP ACK/NACK field 702 and the current TXOP ACK/NACK field 704 is provided for illustration purposes only to show the relative differences between the length of the previous TXOP ACK/NACK field 702 and the length of the current TXOP ACK/NACK field 704 in this example.

Figure 8C:
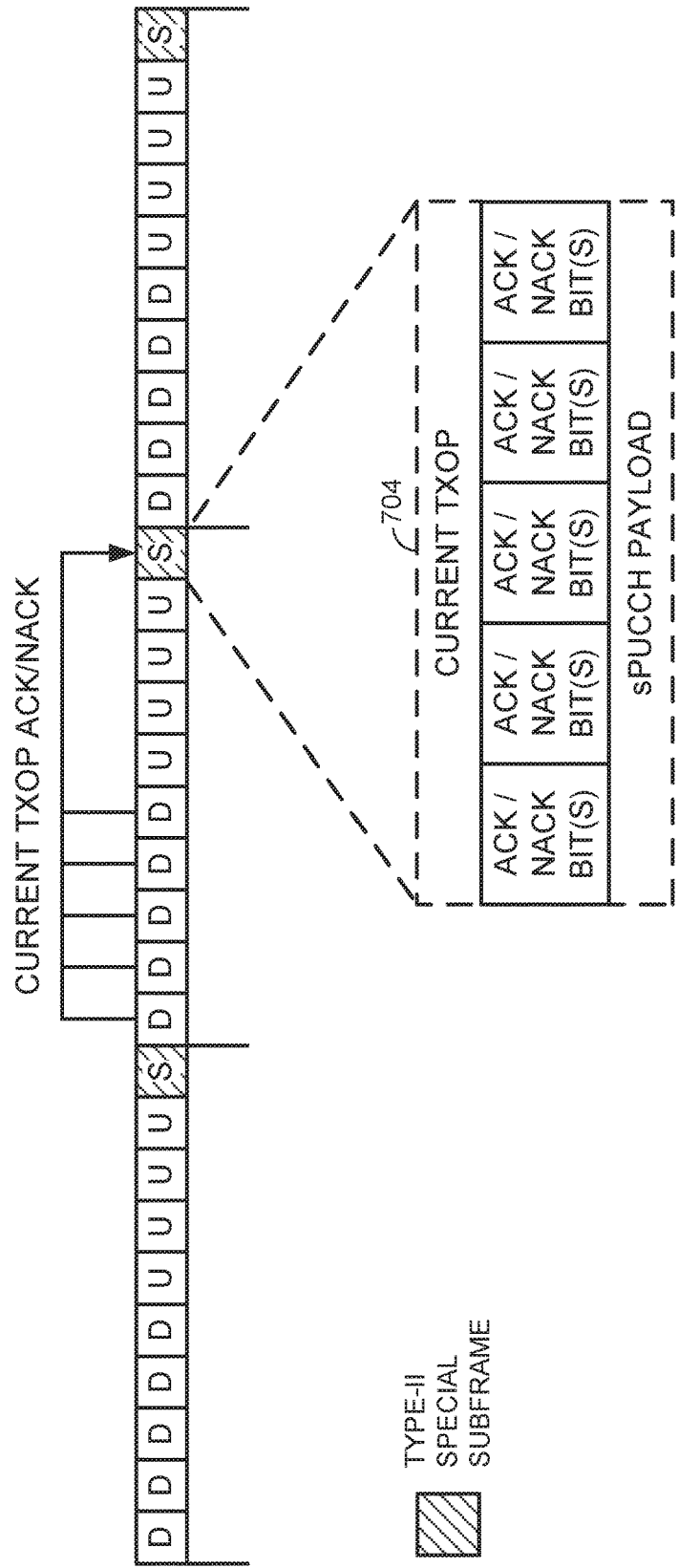

In the example of FIG. 8C, the type-II special subframe and the balanced TDD configuration (5 downlink subframes/4 uplink subframes) described in detail above with reference to FIG. 6B are shown along with an example minimum acknowledgment processing delay of 4 subframes for illustration purposes. Here, the sPUCCH payload may be able to accommodate ACK/NACK for all 5 of the downlink subframes from the current TXOP since no downlink subframes are less than 4 subframes from the special subframe carrying the sPUCCH.

Accordingly, in this example, each of the ACK/NACK bits may be allocated to the current TXOP ACK/NACK field 704. It will again be appreciated that the specific ACK/NACK bit allocation may vary from application to application, and that the illustrated allocation of 5 sets of one or more ACK/NACK bits is provided for illustration purposes only. In this way, the type-II special subframe 620 may be additionally advantageous in such deployments because it may provide for a simplified sPUCCH payload structure. Nevertheless, even for some type-II special subframe designs, it may be advantageous for the separation between the previous TXOP ACK/NACK field 702 and the current TXOP ACK/NACK field 704 to be retained, such as for more downlink-heavy TDD configurations.

Figure 8D:
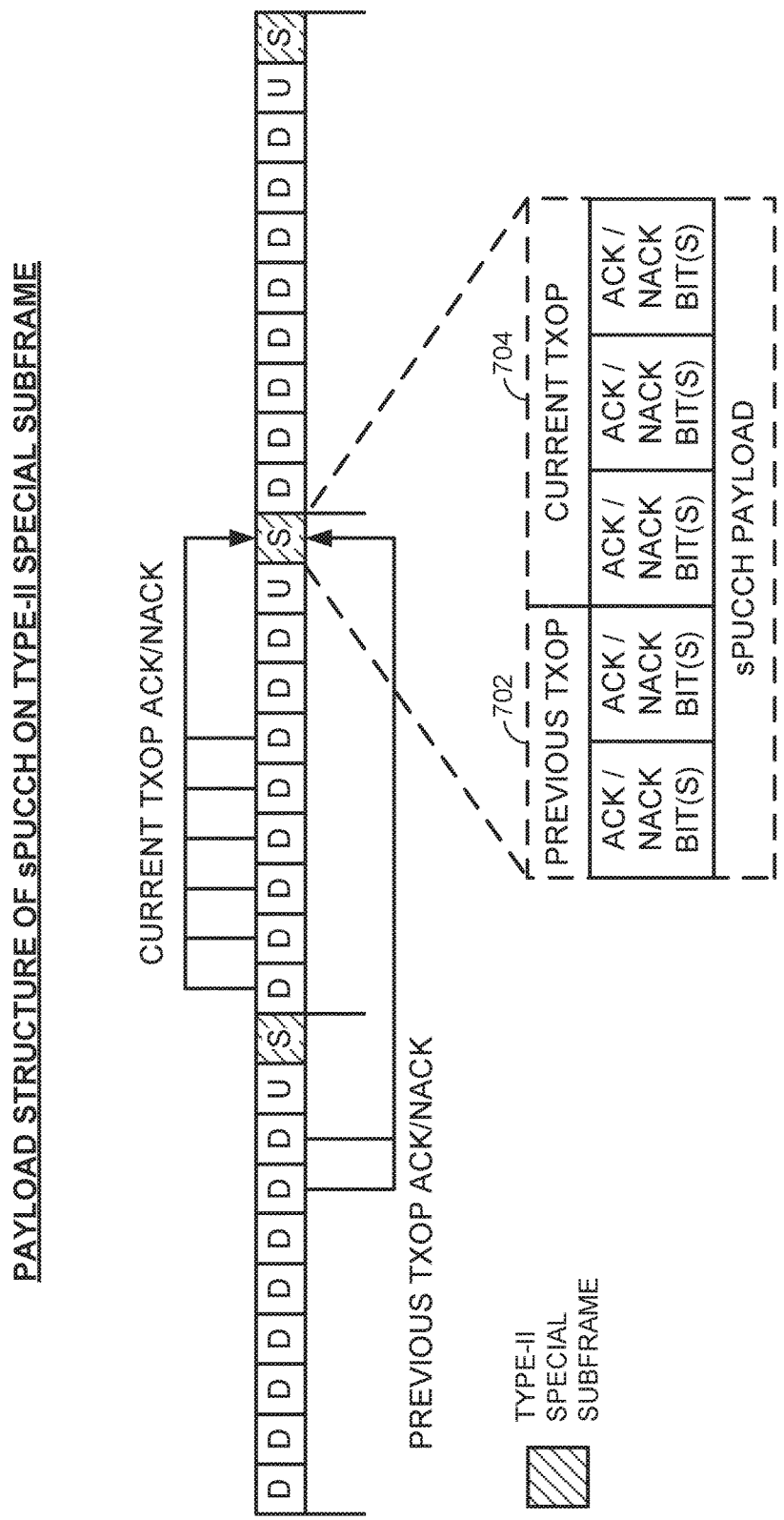

In the example of FIG. 8D, the type-II special subframe and a more downlink-heavy TDD configuration (8 downlink subframes/1 uplink subframe) are shown along with an example minimum acknowledgment processing delay of 4 subframes for illustration purposes. Here, the sPUCCH payload may need to accommodate ACK/NACK for 2 downlink subframes from the previous TXOP (including those downlink subframes that are less than 4 subframes from the special subframe carrying the sPUCCH) and 6 downlink subframes from the current TXOP (including those downlink subframes that are at least 4 subframes from the special subframe carrying the sPUCCH).

Accordingly, in this example, more ACK/NACK bits may be allocated to the current TXOP ACK/NACK field 704 as compared to the previous TXOP ACK/NACK field 702, although the previous TXOP ACK/NACK field 702 may still be utilized. It will again be appreciated that the specific number and proportion of the ACK/NACK bit allocation may vary from application to application, and that the illustrated allocation of 5 sets of one or more ACK/NACK bits across the previous TXOP ACK/NACK field 702 and the current TXOP ACK/NACK field 704 is provided for illustration purposes only to show the relative differences between the length of the previous TXOP ACK/NACK field 702 and the length of the current TXOP ACK/NACK field 704 in this example.

Figure 9:
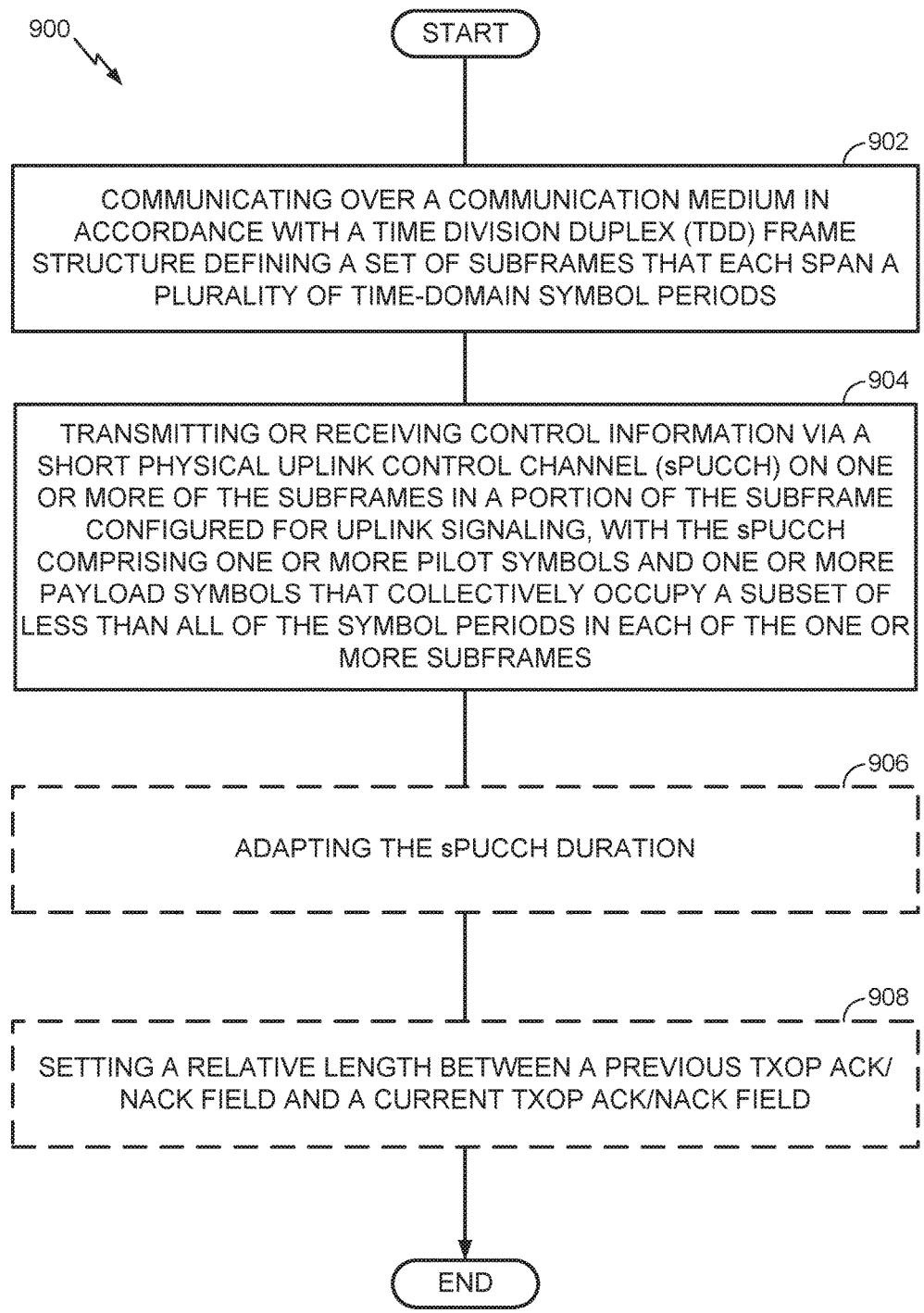
FIG. 9 is a flow diagram illustrating an example method of communication in accordance with the techniques described herein.

FIG. 9 is a flow diagram illustrating an example method of communication in accordance with the techniques described above. The method 900 may be performed, for example, by an access point (e.g., the access point 110 illustrated in FIG. 1) or an access terminal (e.g., the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point or access terminal may communicate over a communication medium in accordance with a TDD frame structure defining a set of subframes that each span a plurality of time-domain symbol periods (block 902). The access point may transmit or the access terminal may receive control information via an sPUCCH on one or more of the subframes in a portion of the subframe configured for uplink signaling, with the sPUCCH comprising one or more pilot symbols and one or more payload symbols that collectively occupy a subset of less than all of the symbol periods in each of the one or more subframes (block 904).

In some designs or scenarios, the access point may (e.g., semi-statically) adapt the sPUCCH duration (optional block 906), for example, by monitoring traffic conditions on the communication medium, configuring a duration indicator for the sPUCCH based on the monitored traffic conditions, and broadcasting or multicasting the duration indicator to one or more access terminals.

As discussed in more detail above, the sPUCCH may span a plurality of interlaced RBs formed from a set of frequency-domain subcarriers. Further, a plurality of access terminals may be multiplexed on the sPUCCH in the frequency domain, the time domain, or a combination thereof.

As also discussed in more detail above, the sPUCCH may be transmitted or received on an uplink portion of a special subframe among the subframes defined by the TDD frame structure. The uplink portion in which the sPUCCH is transmitted or received may be located at the end of the special subframe following a downlink portion and a gap portion of the special subframe. Here, the special subframe may be located at a downlink-to-uplink transition boundary within the TDD frame structure. Alternatively, the uplink portion in which the sPUCCH is transmitted or received may be located at the beginning of the special subframe preceding a downlink portion and a gap portion of the special subframe. Here, the special subframe may be located at an uplink-to-downlink transition boundary within the TDD frame structure.

As also discussed in more detail above, the sPUCCH payload symbols may comprise ACK/NACK indicators that are separated into a previous TXOP ACK/NACK field and a current TXOP ACK/NACK field. In some designs or scenarios, the access point may set a relative length between the previous TXOP ACK/NACK field and the current TXOP ACK/NACK field (optional block 908) based on (i) a location of a special subframe within the TDD frame structure in which the sPUCCH is transmitted or received, (ii) a TDD configuration associated with the TDD frame structure, or (iii) a combination thereof.

For generality, the access point 110 and the access terminal 120 are shown in FIG. 1 only in relevant part as including the control channel manager 112 and the control channel manager 122, respectively. It will be appreciated, however, that the access point 110 and the access terminal 120 may be configured in various ways to provide or otherwise support the control channel signaling techniques discussed herein.

Figure 10:
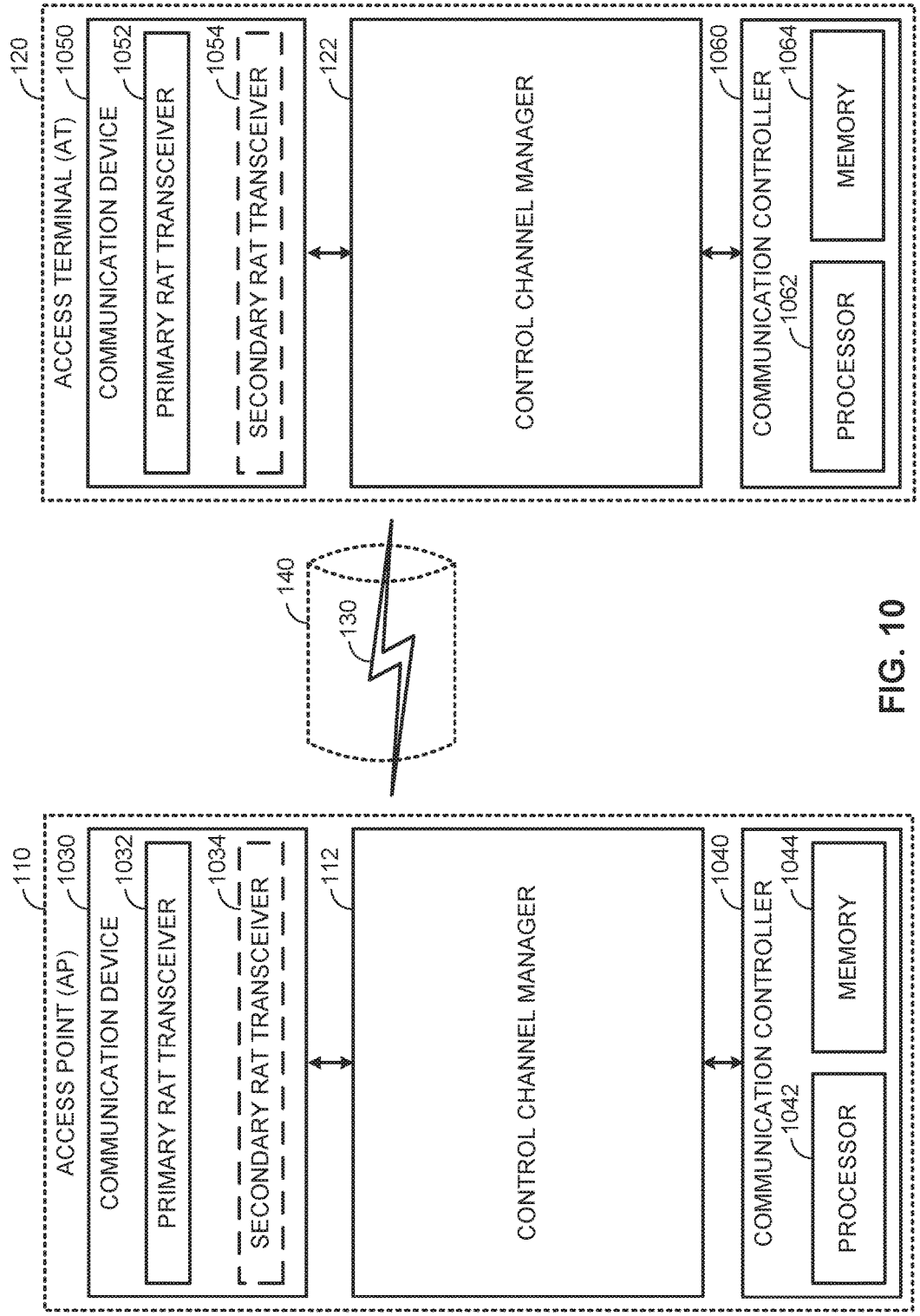
FIG. 10 is a device-level diagram illustrating example components of an access point and an access terminal in more detail.

FIG. 10 is a device-level diagram illustrating example components of the access point 110 and the access terminal 120 of the primary RAT system 100 in more detail. As shown, the access point 110 and the access terminal 120 may each generally include a wireless communication device (represented by the communication devices 1030 and 1050) for communicating with other wireless nodes via at least one designated RAT. The communication devices 1030 and 1050 may be variously configured for transmitting and encoding signals, and, conversely, for receiving and decoding signals in accordance with the designated RAT (e.g., messages, indications, information, pilots, and so on).

The communication devices 1030 and 1050 may include, for example, one or more transceivers, such as respective primary RAT transceivers 1032 and 1052, and, in some designs, (optional) co-located secondary RAT transceivers 1034 and 1054, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 1040 and 1060) for controlling operation of their respective communication devices 1030 and 1050 (e.g., directing, modifying, enabling, disabling, etc.). The communication controllers 1040 and 1060 may include one or more processors 1042 and 1062, and one or more memories 1044 and 1064 coupled to the processors 1042 and 1062, respectively. The memories 1044 and 1064 may be configured to store data, instructions, or a combination thereof, either as on-board cache memory, as separate components, a combination, etc. The processors 1042 and 1062 and the memories 1044 and 1064 may be standalone communication components or may be part of the respective host system functionality of the access point 110 and the access terminal 120.

It will be appreciated that the control channel manager 112 and the control channel manager 122 may be implemented in different ways. In some designs, some or all of the functionality associated therewith may be implemented by or otherwise at the direction of at least one processor (e.g., one or more of the processors 1042 and/or one or more of the processors 1062), at least one memory (e.g., one or more of the memories 1044 and/or one or more of the memories 1064), at least one transceiver (e.g., one or more of the transceivers 1032 and 1034 and/or one or more of the transceivers 1052 and 1054), or a combination thereof. In other designs, some or all of the functionality associated therewith may be implemented as a series of interrelated functional modules.

Accordingly, it will be appreciated that the components in FIG. 10 may be used to perform operations described above with respect to FIGS. 1-9. For example, the access point 110 may control communication, via the processor 1042 and the memory 1044, over the communication medium 140 in accordance with a TDD frame structure defining a set of subframes that each span a plurality of time-domain symbol periods. The access point 110 may transmit, via the primary RAT transceiver 1032, control information via an sPUCCH on one or more of the subframes in a portion of the subframe configured for uplink signaling, with the sPUCCH comprising one or more pilot symbols and one or more payload symbols that collectively occupy a subset of less than all of the symbol periods in each of the one or more subframes. The access point 110 may also adapt, via the processor 1042 and the memory 1044, the sPUCCH duration, for example, by monitoring traffic conditions on the communication medium, configuring a duration indicator for the sPUCCH based on the monitored traffic conditions, and directing the primary RAT transceiver 1032 to broadcast or multicast the duration indicator to one or more access terminals. In addition, the access point 110 may also set, via the processor 1042 and the memory 1044, a relative length between the previous TXOP ACK/NACK field and the current TXOP ACK/NACK field based on (i) a location of a special subframe within the TDD frame structure in which the sPUCCH is transmitted or received, (ii) a TDD configuration associated with the TDD frame structure, or (iii) a combination thereof.

As another example, the access terminal 120 may control communication, via the processor 1062 and the memory 1064, over the communication medium 140 in accordance with a TDD frame structure defining a set of subframes that each span a plurality of time-domain symbol periods. The access terminal 120 may receive, via the primary RAT transceiver 1052, control information via an sPUCCH on one or more of the subframes in a portion of the subframe configured for uplink signaling, with the sPUCCH comprising one or more pilot symbols and one or more payload symbols that collectively occupy a subset of less than all of the symbol periods in each of the one or more subframes.

Figure 11:
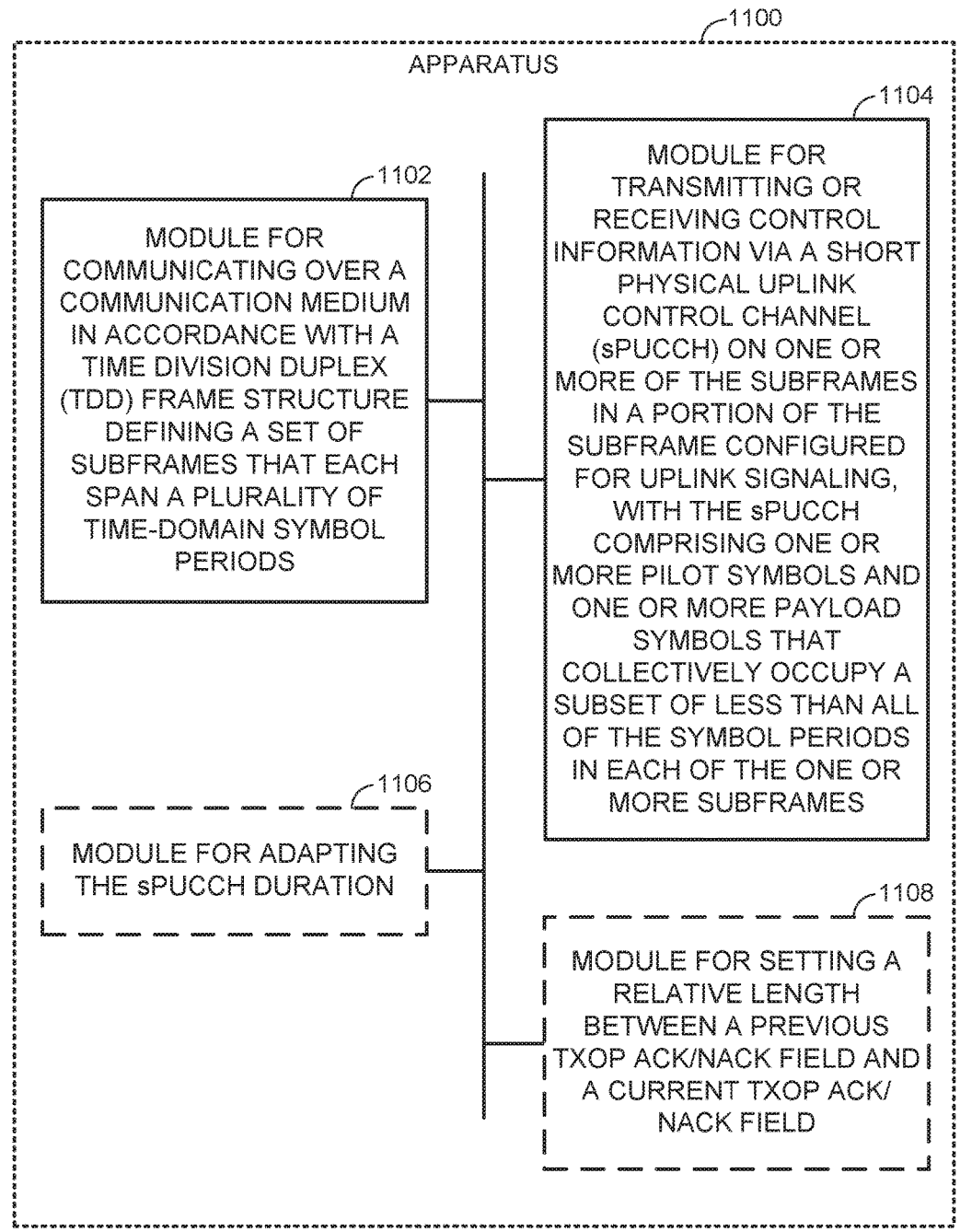
FIG. 11 illustrates an example apparatus represented as a series of interrelated functional modules.

FIG. 11 illustrates an example access point apparatus for implementing the control channel manager 112 and/or the control channel manager 122 represented as a series of interrelated functional modules. In the illustrated example, the apparatus 1100 includes a module for communicating 1102, a module for transmitting or receiving 1104, an (optional) module for adapting 1106, and an (optional) module for setting 1108.

The module for communicating 1102 may be configured to communicate over a communication medium in accordance with a TDD frame structure defining a set of subframes that each span a plurality of time-domain symbol periods. The module for transmitting or receiving 1104 may be configured to transmit or receive control information via an sPUCCH on one or more of the subframes in a portion of the subframe configured for uplink signaling, with the sPUCCH comprising one or more pilot symbols and one or more payload symbols that collectively occupy a subset of less than all of the symbol periods in each of the one or more subframes.

In some designs or scenarios, the (optional) module for adapting 1106 may be configured to (e.g., semi-statically) adapt the sPUCCH duration, for example, by monitoring traffic conditions on the communication medium, configuring a duration indicator for the sPUCCH based on the monitored traffic conditions, and broadcasting or multicasting the duration indicator to one or more access terminals.

As discussed in more detail above, the sPUCCH may span a plurality of interlaced RBs formed from a set of frequency-domain subcarriers. Further, a plurality of access terminals may be multiplexed on the sPUCCH in the frequency domain, the time domain, or a combination thereof.

As also discussed in more detail above, the sPUCCH may be transmitted or received on an uplink portion of a special subframe among the subframes defined by the TDD frame structure. The uplink portion in which the sPUCCH is transmitted or received may be located at the end of the special subframe following a downlink portion and a gap portion of the special subframe. Here, the special subframe may be located at a downlink-to-uplink transition boundary within the TDD frame structure. Alternatively, the uplink portion in which the sPUCCH is transmitted or received may be located at the beginning of the special subframe preceding a downlink portion and a gap portion of the special subframe. Here, the special subframe may be located at an uplink-to-downlink transition boundary within the TDD frame structure.

As also discussed in more detail above, the sPUCCH payload symbols may comprise ACK/NACK indicators that are separated into a previous TXOP ACK/NACK field and a current TXOP ACK/NACK field. In some designs or scenarios, the (optional) module for setting 1108 may be configured to set a relative length between the previous TXOP ACK/NACK field and the current TXOP ACK/NACK field based on (i) a location of a special subframe within the TDD frame structure in which the sPUCCH is transmitted or received, (ii) a TDD configuration associated with the TDD frame structure, or (iii) a combination thereof.

The functionality of the modules of FIG. 11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 11, as well as other components and functions described herein, may be implemented using any suitable means. Such means also may be implemented, at least in part, using corresponding structure as taught herein. For example, the components described above in conjunction with the "module for" components of FIG. 11 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIG. 11 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
   controlling communication over a communication medium in accordance with a Time Division Duplex (TDD) frame structure defining a set of subframes that each span a plurality of time-domain symbol periods; and
   transmitting or receiving control information via a short Physical Uplink Control Channel (sPUCCH) on one or more subframes of the set of subframes in a portion of the one or more subframes configured for uplink signaling, wherein the sPUCCH comprises one or more pilot symbols and one or more payload symbols that collectively occupy less than all of the plurality of time-domain symbol periods in each of the one or more subframes,
   wherein the sPUCCH is transmitted or received on an uplink portion of a special subframe among the set of subframes defined by the TDD frame structure, and wherein the uplink portion in which the sPUCCH is transmitted or received is located at the beginning of the special subframe preceding a gap portion and a downlink portion, respectively, of the special subframe.

2. The method of claim 1, wherein the sPUCCH spans a plurality of interlaced Resource Blocks (RBs) formed from a set of frequency-domain subcarriers.

3. The method of claim 1, further comprising:
monitoring traffic conditions on the communication medium;
configuring a duration indicator for the sPUCCH based on the monitored traffic conditions; and
broadcasting or multicasting the duration indicator to one or more access terminals.

4. The method of claim 1, further comprising multiplexing a plurality of access terminals on the sPUCCH in a frequency domain, a time domain, or a combination thereof.

5. The method of claim 1, wherein the special subframe is located at an uplink-to-downlink transition boundary within the TDD frame structure.

6. The method of claim 1, wherein the sPUCCH payload symbols comprise acknowledgment/negative acknowledgment (ACK/NACK) indicators that are separated into a previous transmission opportunity (TXOP) ACK/NACK field and a current TXOP ACK/NACK field.

7. The method of claim 6, further comprising setting a relative length between the previous TXOP ACK/NACK field and the current TXOP ACK/NACK field based on a location of a special subframe within the TDD frame structure in which the sPUCCH is transmitted or received.

8. The method of claim 6, further comprising setting a relative length between the previous TXOP ACK/NACK field and the current TXOP ACK/NACK field based on a TDD configuration associated with the TDD frame structure.

9. A communication apparatus, comprising:
at least one processor;
at least one memory coupled to the at least one processor, the at least one processor and the at least one memory being configured to control communication over a communication medium in accordance with a Time Division Duplex (TDD) frame structure defining a set of subframes that each span a plurality of time-domain symbol periods; and
at least one transceiver configured to transmit or receive control information via a short Physical Uplink Control Channel (sPUCCH) on one or more subframes of the set of subframes in a portion of the one or more subframes configured for uplink signaling, wherein the sPUCCH comprises one or more pilot symbols and one or more payload symbols that collectively occupy less than all of the plurality of time-domain symbol periods in each of the one or more subframes;
wherein the at least one transceiver is further configured to transmit or receive the sPUCCH on an uplink portion of a special subframe among the set of subframes defined by the TDD frame structure, and
wherein the uplink portion in which the sPUCCH is transmitted or received is located at the beginning of the special subframe preceding a gap portion and a downlink portion, respectively, of the special subframe.

10. The apparatus of claim 9, wherein the sPUCCH spans a plurality of interlaced Resource Blocks (RBs) formed from a set of frequency-domain subcarriers.

11. The apparatus of claim 9, wherein:
the at least one processor and the at least one memory are further configured to monitor traffic conditions on the communication medium and configure a duration indicator for the sPUCCH based on the monitored traffic conditions; and
the at least one transceiver is further configured to broadcast or multicast the duration indicator to one or more access terminals.

12. The apparatus of claim 9, wherein the at least one processor and the at least one memory are further configured to multiplex a plurality of access terminals on the sPUCCH in a frequency domain, a time domain, or a combination thereof.

13. The apparatus of claim 9, wherein the special subframe is located at an uplink-to-downlink transition boundary within the TDD frame structure.

14. The apparatus of claim 9, wherein the sPUCCH payload symbols comprise acknowledgment/negative acknowledgment (ACK/NACK) indicators that are separated into a previous transmission opportunity (TXOP) ACK/NACK field and a current TXOP ACK/NACK field.

15. The apparatus of claim 14, wherein the at least one processor and the at least one memory are further configured to set a relative length between the previous TXOP ACK/NACK field and the current TXOP ACK/NACK field based on a location of a special subframe within the TDD frame structure in which the sPUCCH is transmitted or received.

16. The apparatus of claim 14, wherein the at least one processor and the at least one memory are further configured to set a relative length between the previous TXOP ACK/NACK field and the current TXOP ACK/NACK field based on a TDD configuration associated with the TDD frame structure.

17. An apparatus, comprising:
means for controlling communication over a communication medium in accordance with a Time Division Duplex (TDD) frame structure defining a set of subframes that each span a plurality of time-domain symbol periods; and
means for transmitting or receiving control information via a short Physical Uplink Control Channel (sPUCCH) on one or more subframes of the set of subframes in a portion of the one or more subframes configured for uplink signaling, wherein the sPUCCH comprises one or more pilot symbols and one or more payload symbols that collectively occupy less than all of the plurality of time-domain symbol periods in each of the one or more subframes;
wherein the means for transmitting is further configured to transmit or receive the sPUCCH on an uplink portion of a special subframe among the set of subframes defined by the TDD frame structure, and
wherein the uplink portion in which the sPUCCH is transmitted or received is located at the beginning of the special subframe preceding a gap portion and a downlink portion, respectively, of the special subframe.

18. The apparatus of claim 17, wherein the sPUCCH spans a plurality of interlaced Resource Blocks (RBs) formed from a set of frequency-domain subcarriers.

19. A non-transitory computer-readable medium comprising code, which, when executed by at least one processor, causes the at least one processor to perform operations for communication, the non-transitory computer-readable medium comprising:
code for controlling communication over a communication medium in accordance with a Time Division Duplex (TDD) frame structure defining a set of subframes that each span a plurality of time-domain symbol periods; and code for transmitting or receiving control information via a short Physical Uplink Control Channel (sPUCCH) on one or more subframes of the set of subframes in a portion of the one or more subframes configured for uplink signaling, wherein the sPUCCH comprises one or more pilot symbols and one or more payload symbols that collectively occupy less than all of the plurality of time-domain symbol periods in each of the one or more subframes;

wherein the sPUCCH is transmitted or received on an uplink portion of a special subframe among the set of subframes defined by the TDD frame structure, and wherein the uplink portion in which the sPUCCH is transmitted or received is located at the beginning of the special subframe preceding a gap portion and a downlink portion, respectively, of the special subframe.

20. The non-transitory computer-readable medium of claim 19, wherein the sPUCCH spans a plurality of interlaced Resource Blocks (RBs) formed from a set of frequency-domain subcarriers.

\* \* \* \* \*